(12) United States Patent
Won

(10) Patent No.: US 6,169,348 B1
(45) Date of Patent: Jan. 2, 2001

(54) FLAT TYPE TWO-PHASE VIBRATION MOTOR

(75) Inventor: Sung-Hong Won, Seoul (KR)

(73) Assignee: Samsung Electro-Mechanics Co., Ltd., Kyungki-Do (KR)

( * ) Notice: Under 35 U.S.C. 154(b), the term of this patent shall be extended for 0 days.

(21) Appl. No.: 09/344,207

(22) Filed: Jun. 24, 1999

(30) Foreign Application Priority Data

Dec. 30, 1998 (KR) .................................................. 98-60648

(51) Int. Cl.⁷ .............................. H02K 7/06; H02K 1/00; H02K 1/22; H04Q 1/30; H01H 19/58
(52) U.S. Cl. ........................... 310/81; 310/268; 310/237; 310/242; 310/40 MM; 310/198; 340/311.1; 200/11 DA
(58) Field of Search ........................ 310/81, 80, 40 MM, 310/268, 264, 261, 195, 198, 229, 233, 237, 242; 340/311.1, 825.46; 200/11 R, 11 DA; 601/46, 60, 65, 67, 69, 70

(56) References Cited

U.S. PATENT DOCUMENTS

| | | | |
|---|---|---|---|
| 2,997,552 | * 8/1961 | Silverschotz | 200/24 |
| 4,037,125 | * 7/1977 | Aoki | 310/248 |
| 4,188,556 | * 2/1980 | Hahn | 310/268 |
| 4,283,644 | * 8/1981 | Kondo et al. | 310/68 R |
| 4,433,263 | * 2/1984 | Longhouse et al. | 310/237 |
| 4,864,276 | * 9/1989 | Tribbey | 340/407 |
| 5,589,722 | * 12/1996 | Sakaguchi et al. | 310/180 |
| 5,712,522 | * 1/1998 | Niimi | 310/248 |
| 5,793,133 | * 8/1998 | Shiraki et al. | 310/81 |
| 5,910,696 | * 6/1999 | Kang | 310/242 |
| 5,942,833 | * 8/1999 | Yamaguchi | 310/81 |

FOREIGN PATENT DOCUMENTS 63-290141 * 11/1988 (JP) .

* cited by examiner

*Primary Examiner*—Nestor Ramirez
*Assistant Examiner*—Dang Dinh Le
(74) *Attorney, Agent, or Firm*—Darby & Darby (57) ABSTRACT

Disclosed is a flat type two-phase vibration motor. The flat type two-phase vibration motor comprises a lower board attached to an upper surface of a lower case; a stator magnet disposed on the lower board and having magnetic poles of the number of 2n where n is an integer of 1 or more; a shaft supported between the lower case and an upper case; an upper board rotatably coupled to the shaft to be eccentrically supported thereby; an armature coil of two phases attached to the upper board such that it has a phase difference of $\pi/2$; a commutator attached to the upper board around the shaft and having a plurality of segments of the number which is two times the number of the magnetic poles; and a pair of brushes having lower ends which are attached to the lower board and upper ends which are arranged such that they can be brought into contact with the segments of the commutator while being separated from each other by an electrical angle of $\pi$.

10 Claims, 7 Drawing Sheets

(Conventional Art)

FLAT TYPE TWO-PHASE VIBRATION MOTOR

BACKGROUND OF THE INVENTION

1. Field of the Invention

The present invention relates to a flat type two-phase vibration motor which is simplified in its structure to render economical fabrication and augments interlinkage magnetic flux flowing through coils thereby elevating torque.

2. Description of the Related Art

Generally, communication indicates a technique for transmitting or exchanging intentions between two parties, and as representative means for communication, telephone, mail or facsimile are mainly used.

Among various communication means, a wireless communication technique is a rapidly growing field which is worthy of close attention.

A wireless communication technique is a much innovative technical field which enables direct conversation or intention transmission to be effected even in distant back country because it does not need communication connection means such as wire.

Among various wireless communication techniques, personal portable communication is attracting public attention. As a personal portable communication device, a portable phone or a beeper have been mainly used.

Especially, in view of the fact that a portable phone is capable of affording direct conversation, recently and all over the world, the use of portable phones has explosively increased to take the place of a general wire telephone. In addition, by using a satellite, it becomes possible to bind all the nations of the world into a single communication area, whereby the portable phone leads the transformation which is so called a communication revolution.

On the other hand, while a beeper has somewhat reduced message transmitting efficiency when compared to a portable phone because it transmits a message into the form of characters, since its purchase price and maintenance cost are relatively low, it has been widely used together with a portable phone.

Besides this, various personal portable communication devices have been developed at the present stage, and accordingly, this communication field will be considered as an up-to-date technology together with the computer field in the near future.

In the meanwhile, transmitting and receiving functions for transmitting or receiving a voice or a message are required in these communication devices, and in addition, an incoming call notifying function is also required therein.

As means for performing the incoming call notifying function, a sounding mode in which a bell or a melody is used and a vibrating mode which uses a vibration, are widely used.

In other words, if a user optionally selects a kind of bell, melody or vibration to employ in notifying of an incoming call, when an incoming call is received, a preset function is started to notify the user of the portable phone or the beeper of the incoming call.

Between the incoming call notifying modes, the vibration mode is selected so as not to exert offensive influences on its environment. This may occur because the calling signal of the alarm sound by a sound generation device beeps irrespective of the place.

Figure 1:
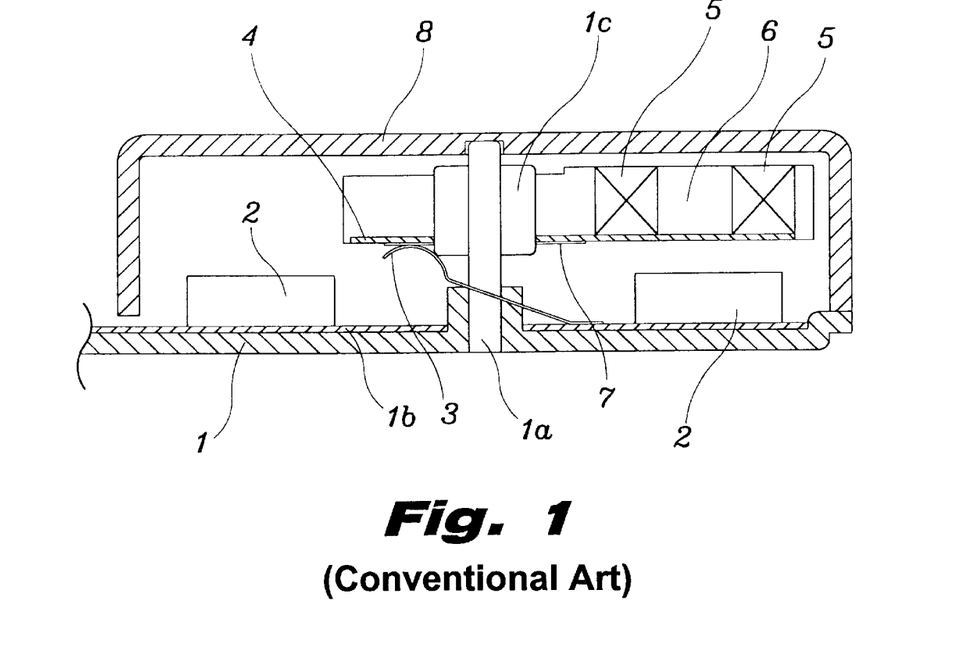
FIG. 1 is a cross-sectional view illustrating a structure of a conventional flat type vibration motor.

On the other hand, the vibration mode is effected by a vibration motor which is disposed in a communication device, and a typical example of this vibration motor is a flat type vibration motor as shown in FIG. 1.

This flat type vibration motor includes a lower case 1 which is disposed in a lower part of the motor. A shaft 1a is fastened to a center portion of the lower case 1, and a lower board 1b is attached to an upper surface of the lower case 1. A magnet 2 in which a center opening of a predetermined diameter is defined and which has a plurality of magnetic poles, is attached to an upper surface of the lower board 1b such that S and N magnetic poles are alternately positioned in a circumferential direction. A pair of brushes 3 are disposed in the center opening of the magnet 2 such that they are placed at different angular positions. The pair of brushes 3 have lower ends which are attached to the lower substrate 1b and upper ends which are positioned higher than the magnet 2.

At this time, a bearing 1c is fitted around the shaft 1a, and a rotor is fitted around the bearing 1c. The rotor comprises largely an upper board 4, and a plurality of winding coils 5 and insulators 6 which are bonded to an upper surface of the upper board 4. The upper board 4 has a configuration which is defined by cutting a circular flat plate at a predetermined angle, to be eccentrically supported by the bearing 1c.

Also, a commutator 7 which is formed with a plurality of segments, is attached to a lower surface of the upper board 4. The plurality of segments are formed such that they extend from an inner edge of the upper board 4 where the upper board 4 is supported by the bearing 1c and they are separated one from another by the same angle. The upper ends of the pair of brushes 3 which have lower ends attached to the lower board 1b, are brought into contact with the plurality of segments of the commutator 7.

On the other hand, an upper case 8 which has a cap-shaped configuration and is opened at its lower end, is coupled to an upper end of the shaft 1a to cover various components provided on the lower case 1 thereby protecting the components from outside interferences.

In the vibration motor constructed as mentioned above, electric power which is inputted through the lower board 1b is transmitted to the commutator 7 via the pair the brushes 3. The electric power which is inputted to the commutator 7 is again transmitted to the winding coils 5 via the upper board 4. Then, by the interaction between the winding coils 5 and the magnet 2 which is attached to the lower case 1, electromagnetic force is generated therebetween to eccentrically rotate the rotor about the shaft 1a, thereby producing vibration.

At this time, vibrating force of the rotor is transmitted to the lower case 1 and the upper case 8 through the shaft 1a, thereby to enable the user of a portable phone or a beeper to be notified of the incoming call.

Figure 2:
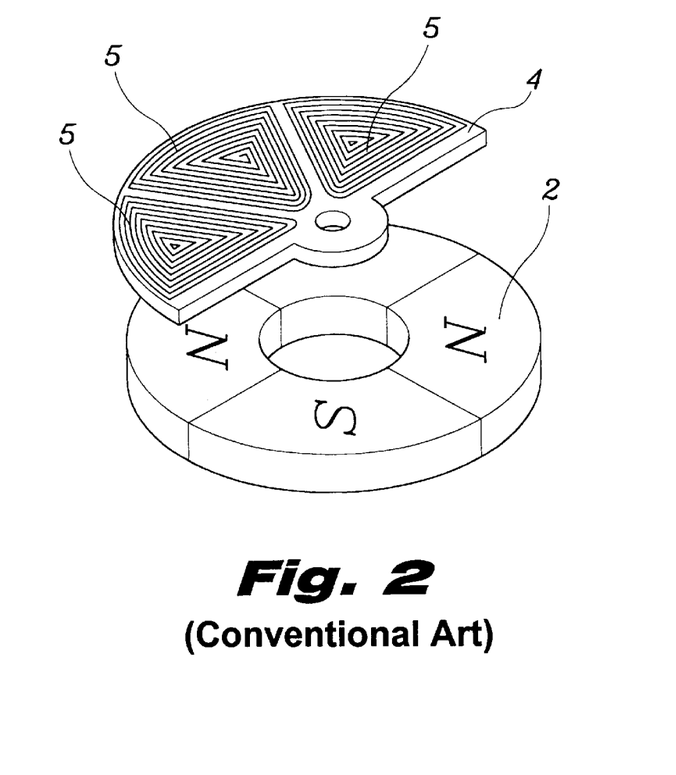
FIG. 2 is a perspective view illustrating coils and magnets of a conventional three-phase driving motor.

While most vibration motors adopt a three-phase driving scheme as shown in FIG. 2, recently, researches have been vigorously conducted in various fields to make miniaturization of the motor possible by compacting a structure of the motor, and a single-phase driving motor and a two-phase driving motor are disclosed in the art as products of these researches.

In a single-phase driving motor, a single-phase coil is formed on an upper board, and by the interaction between the single-phase coil and a magnet which is disposed in opposition to the coil, the upper board onto which the coil is seated is eccentrically rotated, thereby producing vibration. In this type of single-phase driving motor, when the coil is positioned within a range of a magnetic pole of the magnet, a death point where driving force becomes zero and a torque is not generated, is produced.

To cope with this problem of losing driving force, a method for disposing cogging generating means at a proper position is disclosed in the art. However, this method lacks practicality due to spatial limitations in a motor and difficulties in determining the precise position of the death point.

Figure 3:
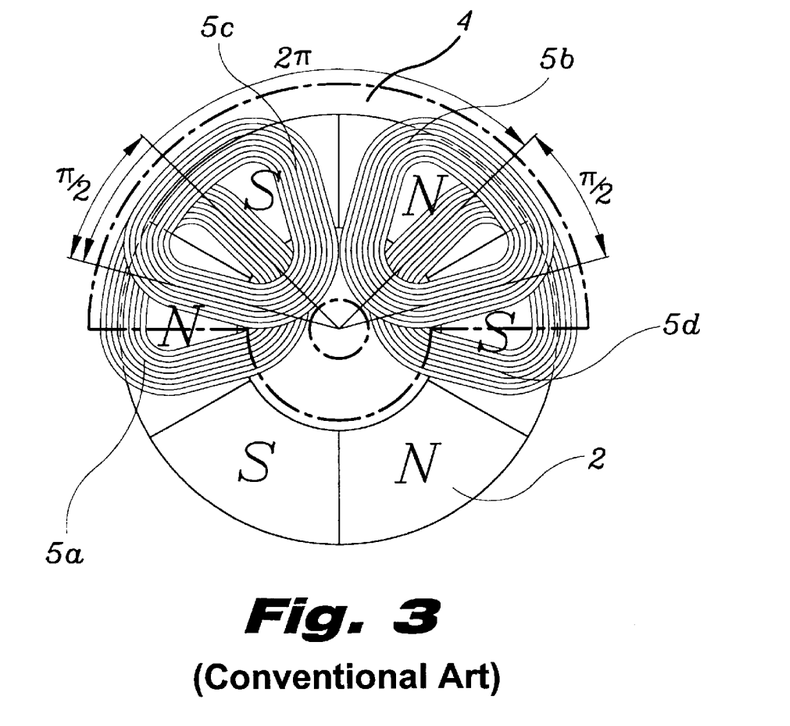
FIG. 3 is a plan view illustrating an arrangement between coils and magnets in a conventional two-phase driving motor.

In the meanwhile, various two-phase driving motors are disclosed in the art while starting from concept in which coils in a three-phase driving scheme are reduced from three phases to two phases. One of the techniques which are recognized as a two-phase driving scheme is disclosed in Japanese Patent Laid-open Publication No. Heisei 9-9596 as shown in FIG. 3.

Major features disclosed in Japanese Patent Laid-open Publication No. Heisei 9-9596 are in that first and second u-phase armature coils 5a and 5b and first and second v-phase armature coils 5c and 5d are located to respectively define a phase of an electrical angle of $2\pi$, and a pair of the first u-phase armature coil 5a and the first v-phase armature coil 5c and a pair of the second u-phase armature coil 5b and the second v-phase armature coil 5d are located to respectively define a phase of an electrical angle of $\pi/2$, whereby a total of four armature coils are eccentrically located on a rotor.

In other words, while the first u-phase armature coil 5a and the first v-phase armature coil 5c are formed such that they have a phase angle of $\pi/2$ and they are overlapped with each other over and under in an axial direction and the second u-phase armature coil 5b and the second v-phase armature coil 5d are formed such that they have a phase angle of $\pi/2$ and they are overlapped with each other over and under in the axial direction, armature coils having the same phase have the phase of the electrical angle of $2\pi$.

Accordingly, when viewed on the basis of the first u-phase armature coil 5a, the first v-phase armature coil 5c is disposed at an electrical angle of $\pi/2$ from the first u-phase armature coil 5a, the second u-phase armature coil 5b is disposed at an electrical angle of $3\pi/2$ from the first v-phase armature coil 5c, and the second v-phase armature coil 5d is disposed at an electrical angle of $\pi/2$ from the second u-phase armature coil 5b.

At this time, a pair of the first u-phase armature coil 5a and the first v-phase armature coil 5c which are disposed at the phase angle of the electrical angle of $\pi/2$, and a pair of the second u-phase armature coil 5b and the second v-phase armature coil 5d which are disposed at the phase angle of the electrical angle of $\pi/2$, are respectively overlapped with each other over and under at their portions such that the first v-phase armature coil 5c and the second u-phase armature coil 5b are positioned over and the first u-phase armature coil 5a and the second v-phase armature coil 5d are positioned under.

Accordingly, the first u-phase armature coil 5a and the second v-phase armature coil 5d have a phase angle therebetween of an electrical angle of $5\pi/2$ and of a mechanical angle of 150°.

On the contrary to the structure as described above, it is possible for a pair of the first u-phase armature coil 5a and the first v-phase armature coil 5c, and a pair of the second u-phase armature coil 5b and the second v-phase armature coil 5d to be respectively overlapped with each other over and under at their portions such that the first and second u-phase armature coils 5a and 5b are positioned over and the first and second v-phase armature coils 5c and 5d are positioned under.

On the other hand, since the number of the magnetic poles, the number of the segments of the commutator and the angle between the brushes are the same as those in a three-phase driving motor, the number of the magnetic poles is 6, the number of the segments of the commutator as being the same as the number of the magnetic poles is 6, and the angle between the brushes is an electrical angle of $\pi$ and a mechanical angle of 60°.

Accordingly, four armature coils are located such that portions of the two armature coils which have the phase of $\pi/2$ are overlapped over and under with each other, two pairs of these two armature coils are opposed to each other, and two armature coils which are positioned over are separated from each other by the electrical angle of $3\pi/2$, whereby the motor can have a characteristic by which it is driven in two-phases.

However, when compared to a three-phase driving motor, because the above structure has a construction in which coils of one-phase are simply omitted, the armature coils comprise the u-phase armature coils and the v-phase armature coils, the u-phase armature coil and the v-phase armature coil have the phase difference of the electrical angle of $\pi/2$ and two armature coils having the same phase are separated from each other by the electrical angle of $2\pi$, the two armature coils having different phases cannot but be formed to have an overlapping structure in which they are overlapped over and under each other.

Therefore, due to the fact that coils of one-phase are omitted among coils of three-phases, driving torque is reduced. Further, due to a limitation in a coil mounting space which is defined in the motor, the number of windings of the coil cannot but be decreased and winding operations are also much involved.

Also, when the brush passes through a space which is defined between two adjoining segments, a phenomenon in which the brush is bounced while hitting against one of the two adjoining segments is generated, producing noise. As an attempt to solve this problem, while it is disclosed in the art to increase a radius of the curved contact end of the brush, at this time, tension which is applied to the brush is reduced, to result in a non-electrification section.

SUMMARY OF THE INVENTION

Accordingly, the present invention has been made in an effort to solve the problems occurring in the related art, and an object of the present invention is to provide a flat type two-phase vibration motor which increases the number of windings of a coil of each phase to augment interlinkage magnetic flux, thereby elevating driving torque.

Another object of the present invention is to provide a flat type two-phase vibration motor which is easily fabricated.

Still another object of the present invention is to provide a flat type two-phase vibration motor which prevents a dead point and a non-electrification section from being generated upon driving a motor, thereby ensuring stable drivability of the motor.

In order to achieve the above object, in the present invention, a stator magnet which is disposed on a lower board, has magnetic poles of the number of 2n where n is an integer of 1 or more; armature coils are attached to an upper board such that they have a phase difference of $\pi/2$; and a pair of brushes which are to be brought into contact with segments of a commutator, are separated from each other by an electrical angle of $\pi$, whereby the number of armature coils which are attached to the upper board, is decreased and it is possible to prevent a dead point and a non-electrification section from being generated upon driving the motor.

BRIEF DESCRIPTION OF THE DRAWINGS

The above objects, and other features and advantages of the present invention will become more apparent after a reading of the following detailed description when taken in conjunction with the drawings, in which.

DETAILED DESCRIPTION OF PREFERRED EMBODIMENTS

The present invention relates to a two-phase vibration motor, and more particularly, the present invention relates to a two-phase vibration motor which increases magnetic flux through a coil to improve torque efficiency and at the same time to render a stable and balanced two-phase driving, by combining the number of magnetic poles of a stator magnet, a pitch of an armature coil, a phase angle between coils having different phases and the number of segments of a commutator.

In other words, a lower board is fastened to an upper surface of a lower case, and a stator magnet is disposed on the lower board. A shaft is supported at a center portion of the lower case. An upper case is coupled to an upper end of the shaft to allow various components provided on the lower case to be protected from the outside.

An upper board is rotatably and eccentrically coupled to the shaft, and an armature coil is attached to an upper surface of the upper board. A commutator comprising a plurality of segments is attached to a lower surface of the upper board. The lower board and the plurality of segments are connected with each other by a pair of brushes for enabling an electrical signal to be smoothly transmitted therebetween.

In the above construction of the two-phase vibration motor of the present invention, the stator magnet has the number of magnetic poles of 2n where n is an integer of 1 or more, the armature coil which interacts with the stator magnet comprises two-phase coils which have different phases, each coil has a pitch of an electrical angle of $\pi/2$–$\pi$, two coils having different phases have a phase difference of an electrical angle of $\pi/2$, the commutator which is electrically connected to the respective coils comprises the plurality of segments of the number which is two times the number of the magnetic poles, and the pair of brushes which connect the lower board and the plurality of segments with each other are separated from each other by an electrical angle of $\pi$.

In other words, in the present invention, the stator magnet is formed such that it has the number of the magnetic poles of 2n where n is an integer of 1 or more, that is, it comprises 2 magnetic poles, 4 magnetic poles, 6 magnetic poles, 8 magnetic poles, etc., and the armature coil which interacts with the stator magnet is formed to have a two-phase structure so that each coil has the pitch of the electrical angle of $\pi/2$–$\pi$ and two coils having different phases have the phase difference of the electrical angle of $\pi/2$.

Accordingly, considering the fact that an electrical angle and a mechanical angle for one magnetic pole vary depending upon the number of magnetic poles of a stator magnet, respective coils of the armature coil are formed to have the pitch of the electrical angle of $\pi/2$–$\pi$ and two coils having different phases are formed to have the phase difference of the electrical angle of $\pi/2$, whereby a two-phase half-wave driving characteristic is accomplished.

Further, by the constructions of the stator magnet and the armature coil, the number of the segments which are terminals of the commutator is changed to be two times the number of the magnetic poles. Consequently, if the stator magnet has two magnetic poles, the commutator has four segments, if the stator magnet has four magnetic poles, the commutator has eight segments, and if the stator magnet has six magnetic poles, the commutator has twelve segments.

The respective segments of the commutator formed as described above are electrically connected to the armature coils which have a phase angle of an electrical angle of $\pi/2$ and are alternately connected, in a rotating direction of the commutator, to the armature coils which have a different phase angle.

That is to say, when assuming that coils having different phase angles are a coil and b coil, the commutator has a structure in which the plurality of segments are connected to +terminal of the a coil, +terminal of the b coil, –terminal of the a coil and –terminal of the b coil in that order.

On the other hand, the pair of brushes are used as means for supplying current to the commutator. Each brush has a lower end which is attached to the lower board and an upper end which is curved toward the plurality of segments of the commutator to be brought into contact therewith. The pair of brushes have a pair of input terminals and a pair of output terminals.

The pair of brushes as described above are separated by the electrical angle of $\pi$ in the present invention.

Namely, in the case that the stator magnet has two magnetic poles, an electrical angle of $\pi$ which corresponds to one magnetic pole becomes a mechanical angle of 180°, in the case that the stator magnet has four magnetic poles, an electrical angle of $\pi$ which corresponds to one magnetic pole becomes a mechanical angle of 90°, in the case that the stator magnet has six magnetic poles, an electrical angle of $\pi$ which corresponds to one magnetic pole becomes a mechanical angle of 60°, and in the case that the stator magnet has 8 magnetic poles, an electrical angle of $\pi$ which corresponds to one magnetic pole becomes a mechanical angle of 45°. Therefore, as a result, even if the angle between the pair of brushes is represented by $\pi$ in an electrical angle, it is diversely represented by 180°, 90°, 60° and 45° in a mechanical angle.

On the other hand, it was found through various performance tests that the motor reveals the most stable drivability when the stator magnet has four magnetic poles. Therefore, the following explanations will be given primarily on the case that the stator magnet has four magnetic poles.

Reference will now be made in greater detail to a preferred embodiment of the invention, an example of which is illustrated in the accompanying drawings. Wherever possible, the same reference numerals will be used throughout the drawings and the description to refer to the same or like parts.

Figure 4:
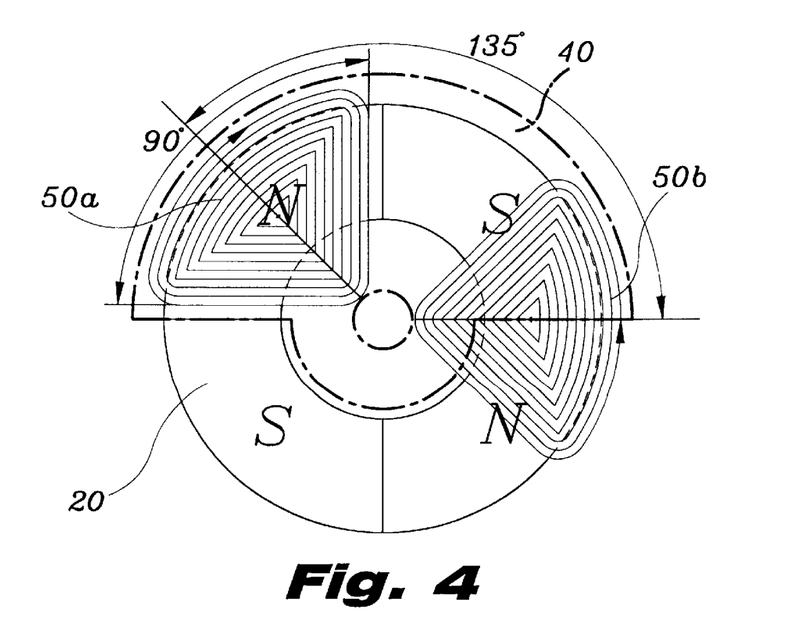
FIG. 4 is a plan view illustrating an arrangement between coils and magnets in accordance with an embodiment of the present invention.

FIG. 4 illustrates a first embodiment of the present invention. In the present embodiment, a stator magnet 20 has four magnetic poles, and an armature coil 50 comprises two coils 50a and 50b which have different phases. The two coils 50a and 50b have a pitch of a mechanical angle of 90° (an electrical angle of $\pi$) and are separated from each other by a center angle of a mechanical angle of 135° (an electrical angle of $3\pi/2$).

At this time, when the pitch of the respective coils 50a and 50b and the center angle between the two coil 50a and 50b are converted into electrical angles, the pitch becomes $\pi$, and a phase angle has a phase difference of an electrical angle of $\pi/2$.

On the other hand, if the phase angle between the two coils 50a and 50b is simply determined as the electrical angle of $\pi/2$, when it is converted into a mechanical angle, it becomes 45°. Therefore, as a result, since a phenomenon in which the two coils 50a and 50b having different phases are overlapped with each other over and under on an upper board 40, occurs, it is difficult to fabricate structurally the motor and driving efficiency is deteriorated.

Accordingly, in the present embodiment, by rotating one coil by the electrical angle of $\pi/2$ and by a mechanical angle of 180°, the one coil is disposed in a position where it has the same electrical characteristic as the other coil. Then, by moving the one coil from the position by an electrical angle of $\pi/2$, it is possible to construct the two coils such that they have different phases while having the phase of $\pi/2$.

At this time, when measuring the center angle between the two coils 50a and 50b, it becomes the mechanical angle of 135°.

Figure 5:
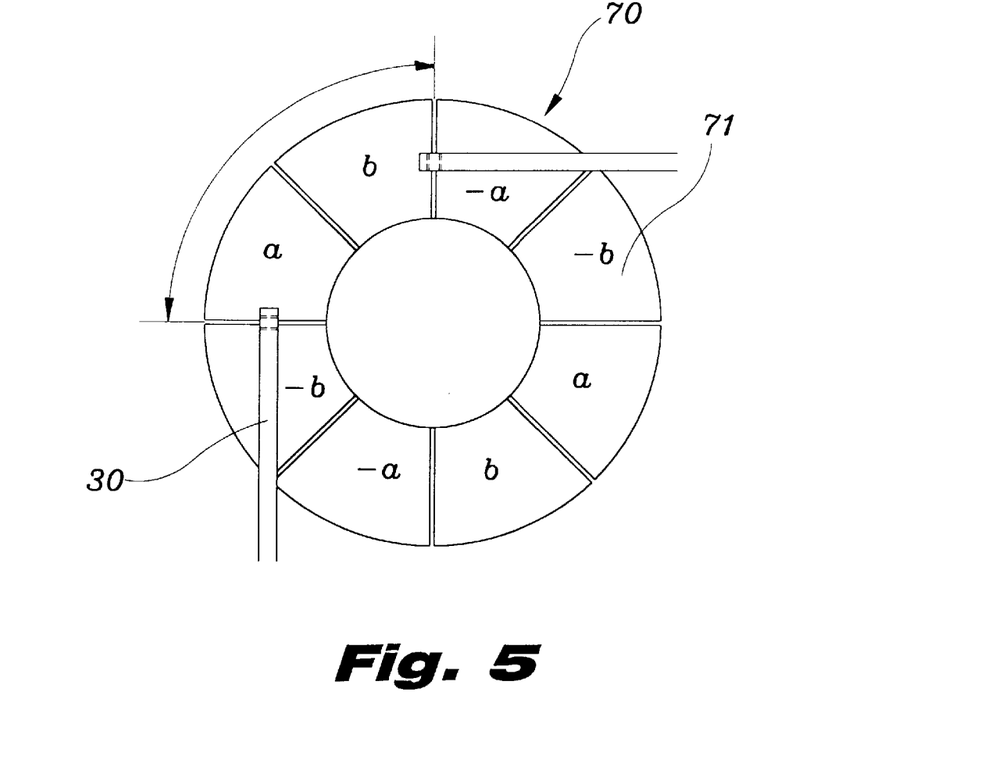
FIG. 5 is a plan view illustrating a state wherein segments of a commutator and a pair of brushes are brought into contact with each other in the arrangement of FIG. 4.

In the constructions of the stator magnet 20 and the armature coil 50, a plurality of segments 71 of a commutator 70 which is connected to the two coils 50a and 50b having different phases are, as shown in FIG. 5, formed such that they have the number of 8 which is two times the number of magnetic poles of the stator magnet 20, and a pair of brushes 30 as being terminals which are brought into contact with the plurality of segments 71, are located such that they are separated by a mechanical angle of 90° (an electrical angle of $\pi$).

At this time, the eight segments 71 are sequentially and alternately connected with +terminals and −terminals of the two coils 50a and 50b having different phase angles in a direction in which the upper board 40 is rotated, whereby, as shown in FIG. 5, when assuming that the two coils 50a and 50b having different phase angles of the armature coil 50 are an a coil 50a and a b coil 50b, respectively, since the two coils 50a and 50b have the input terminals and the output terminals, if an input terminal of the a coil 50a is +a, an output terminal of the a coil 50a is −a, an input terminal of the b coil 50b is +b and an output terminal of the b coil 50b is −b, the plurality of segments 71 are arranged in the order of +a, +b, −a and −b in the rotating direction thereof.

Accordingly, in a state that the pair of brushes 30 are formed at an angle of 90°, if the upper board 40 is rotated by the interaction between the stator magnet 20 and the armature coil 50, the pair of brushes 30 supply electric power to at least one coil of the a coil 50a and the b coil 50b or simultaneously to both of the two coils 50a and 50b, to enable the motor to be continuously driven.

In other words, if electric power is supplied to the input terminal or the output terminal of at least one coil of the two coils 50a and 50b, electromagnetic force is always generated by the interaction between the two coils 50a and 50b and the stator magnet 20, to enable the motor to be continuously driven, thereby ensuring stable drivability of the motor.

On the other hand, because two adjoining segments are separated from each other by a slot, when the pair of brushes 30 which are brought into contact with the plurality of segments 71 pass across the slot, contact between the pair of brushes 30 and the plurality of segments 71 can be momentarily prevented.

Also, when the brush 30 is released from one segment 71 and comes into contact with another segment 71, a phenomenon in which the brush 30 is bounced while hitting against the another segment 71 is generated, producing noise.

This phenomenon is considered as a structural problem which is generated at a moment when a contact end of the brush 30 is simultaneously detached from two adjoining segments 71 as the contact end of the brush 30 passes across the slot 72 which separates the two adjoining segments 71 from each other.

Figure 6:
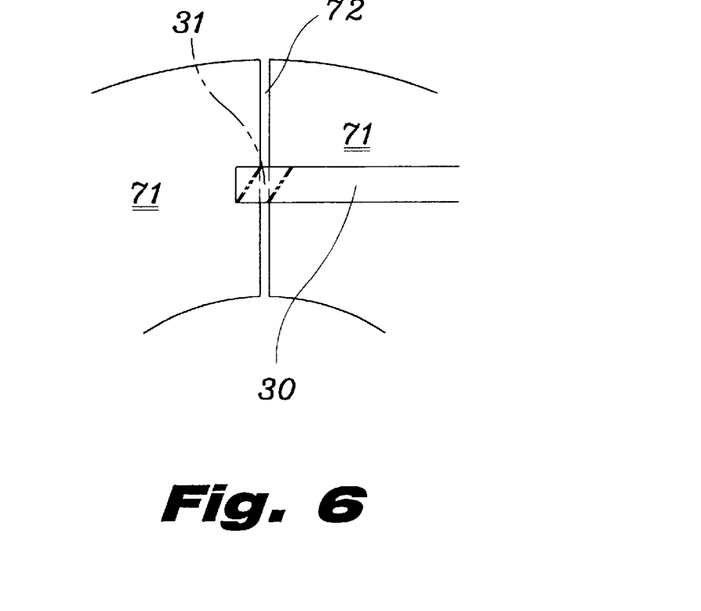
FIGS. 6 through 9 are enlarged bottom views illustrating various contact patterns between the segments of the commutator and the pair of brushes.

To solve this problem, in the present embodiment, as shown in FIG. 6, a curved contact end 31 of each brush 30 is formed such that it is inclined with respect to the slot 72 defined between two adjoining segments 71 of the commutator 70 in a direction which is crossed with a lengthwise direction of the brush 30, whereby the curved contact end 31 of the brush 30 can be brought into contact with one segment of the two adjoining segments 71 or with both of the two adjoining segments 71.

Figure 7:
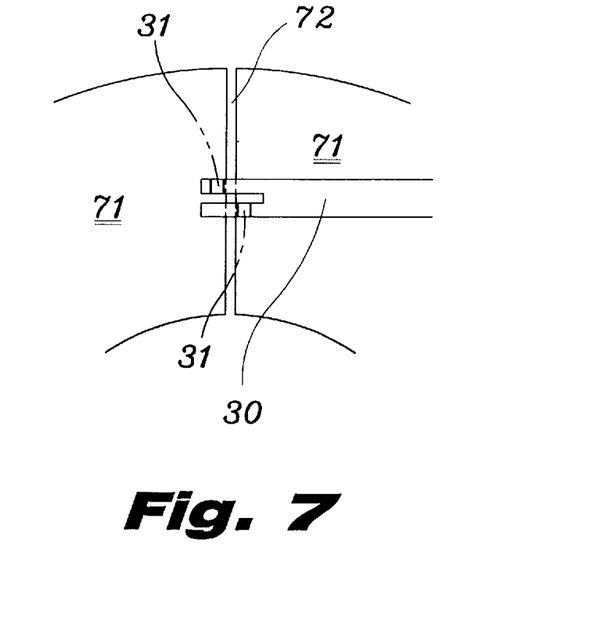

Also, as shown in FIG. 7, one end of each brush 30 can have a yoke-shaped configuration which defines a pair of end portions, and a pair of curved contact ends 31 are formed at the pair of end portions of the brush 30, respectively, such that they are separated by a predetermined distance from each other in a lengthwise direction of the brush 30 while they are maintained at the same distance from the slot 72 defined between two adjoining segments 71 of the commutator 70, whereby the pair of curved contact ends 31 of the brush 30 can be brought into contact with one segment of the two adjoining segments 71 or with both of the two adjoining segments 71.

Figure 8:
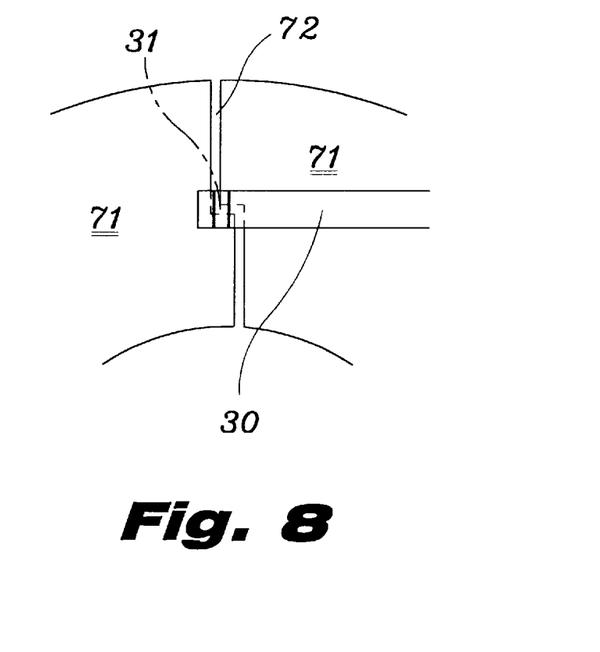

Also, while the brush 30 has a structure which is the same as that of the conventional art, as shown in FIG. 8, the slot 72 which is defined between two adjoining segments 71 of the commutator 70 such that it extends in a radial direction, can include an outer slot portion which is defined outside the segments 71 and an inner slot portion which is defined inside the segments 71. The outer slot portion and the inner slot portion are defined such that they are aligned on two straight lines, respectively, while they are communicated with each other by a middle slot portion which extends in a lengthwise direction of a brush 30, whereby the curved contact end 31 of the brush 30 can be brought into contact with one segment of the two adjoining segments 71 or with both of the two adjoining segments 71.

Figure 9:
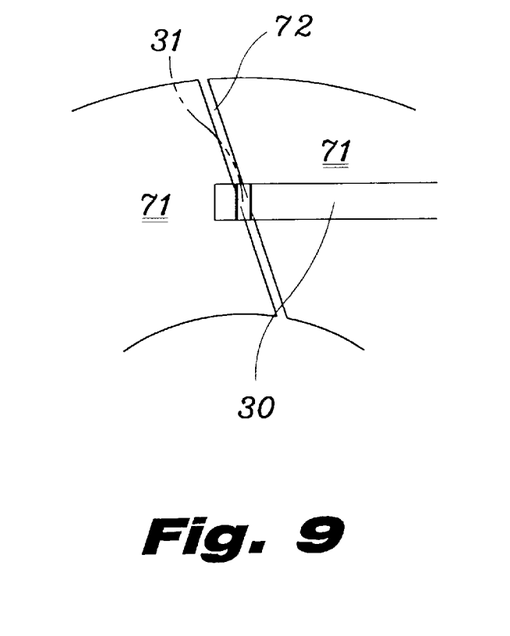

Also, it is preferred that the slot 72 is, as shown in FIG. 9, defined between two adjoining segments 71 of the commutator 70 such that it extends slantingly in a radial direction, whereby the curved contact end 31 of each brush 30 can be brought into contact with one segment of the two adjoining segments 71 or with both of the two adjoining segments 71.

By the aforementioned construction of the first embodiment according to the present invention, as current supplied through the pair of brushes 30 flows through at least one coil of the a coil 50a and the b coil 50b or simultaneously through both of the two coils 50a and 50b, electromagnetic force is continuously generated by the interaction between the two coils 50a and 50b and the stator magnet 20. At this time, because the upper board 40 which is rotatably supported by a shaft is rotated by the generated electromagnetic force, by the eccentric rotation of the upper board 40, a stable vibrating function of the motor is ensured.

Figure 10:
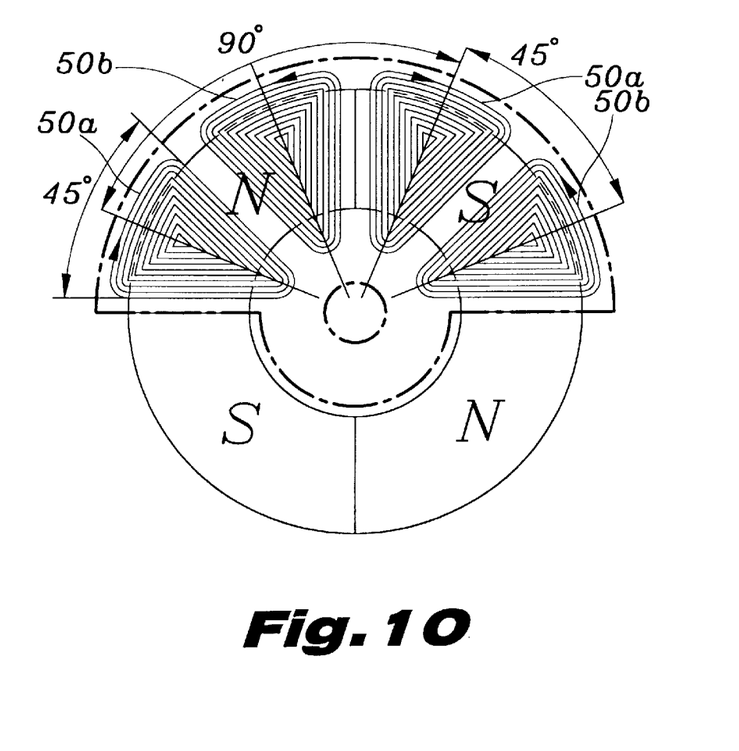
FIG. 10 is a view illustrating an arrangement between coils and magnets in accordance with another embodiment of the present invention.

On the other hand, FIG. 10 illustrates a second embodiment of the present invention. In the present embodiment, a stator magnet 20 has four magnetic poles as in the first embodiment, and an armature coil 50 comprises two coils 50a and 50b which have different phases. An a coil 50a and a b coil 50b which constitute the two coils 50a and 50b, respectively, includes a +a coil and a +b coil as being input-side terminals and a −a coil and a −b coil as being output-side terminals, whereby the armature coil comprises four coils.

At this time, a pitch of the respective coils 50a and 50b is an electrical angle of $\pi/2$ and a mechanical angle of 45°, and a center angle between the two coils 50a and 50b is a mechanical angle of 45°.

That is to say, the +a coil and the +b coil which are input-side coils are arranged side by side such that their winding directions are opposed to each other, and then, the −a coil and the −b coil which are output-side coils are arranged side by side such that their winding directions are opposed to each other. At this time, a pair of the +a coil and the −a coil which have the same phase and a pair of the +b coil and the −b coil which have the same phase, possess the same winding structure, respectively, while being connected in series.

By arranging the four armature coils 50a and 50b as described above, a phase difference between the a coil 50a and the b coil 50b which have different phases becomes an electrical angle of $\pi/2$ as in the first embodiment.

In the second embodiment having the above mentioned coil structure, the number of the segments 71 of the commutator 70 and a center angle between the pair of brushes 30 are the same as those of the first embodiment.

Also, in the second embodiment, in order to ensure stable contact between the plurality of segments 71 of the commutator 70 and the curved contact ends 31 of the pair of brushes 30, the configuration of the curved contact end 31 of the brush 30 can be modified as described with reference to FIGS. 6 or 7, or the configuration of the slot 72 defined between the adjoining segments 71 can be altered as described with reference to FIGS. 8 or 9, whereby a stable electrification is achieved.

Figure 11:
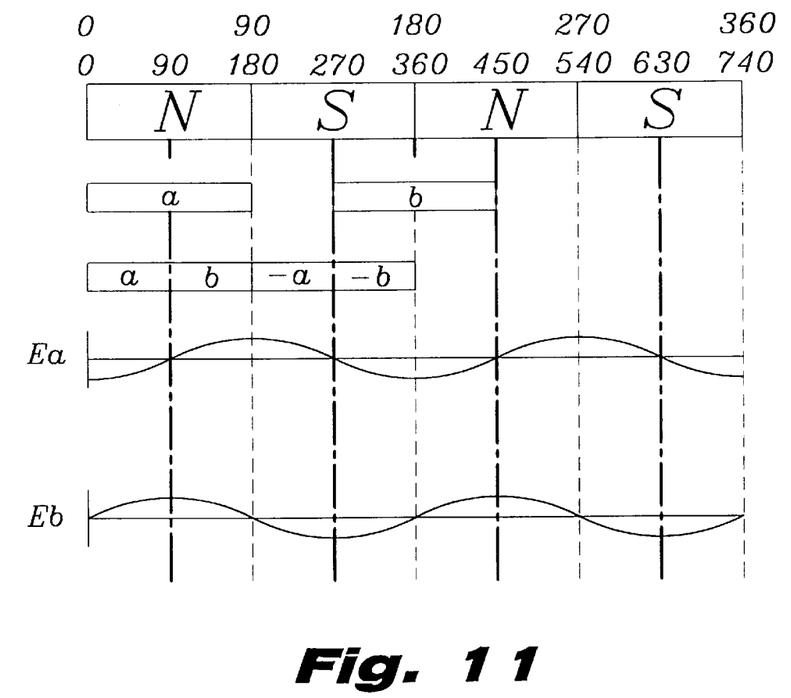
FIG. 11 is a torque waveform diagram according to the present invention.

FIG. 11 illustrates a characteristic of a torque waveform in coils of two-phases according to the present invention, and, at this time, torque waveforms of the coil a and the coil b are the same in the first embodiment and the second embodiment.

Drawing reference numerals Ea and Eb denote waveforms of voltages applied to the a coil and the b coil, respectively. Because intensity of voltage which is applied to the coil contributes to a physical torque generation due to characteristics of a motor, the waveforms Ea and Eb represent torque waveforms.

Figure 12:
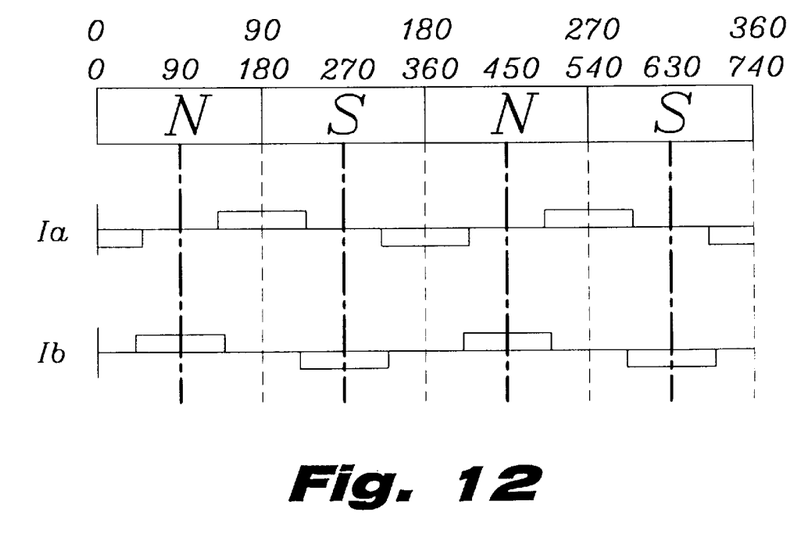
FIG. 12 is a diagram illustrating electrification states of coils according to the present invention.

Accordingly, by observing the waveform in the a coil and the torque waveform in the b coil, it is to be readily understood that the two coils have a phase difference of an electrical angle of $\pi/2$. While current which is supplied to the respective coils alternately flows therethrough as shown in FIG. 12, when current flow is converted from the a coil to the b coil or from the b coil to the a coil, a section where current simultaneously flows to the a coil and the b coil exists, whereby a stable electrification is maintained in the coils without any cut-off in current supply.

Figure 13:
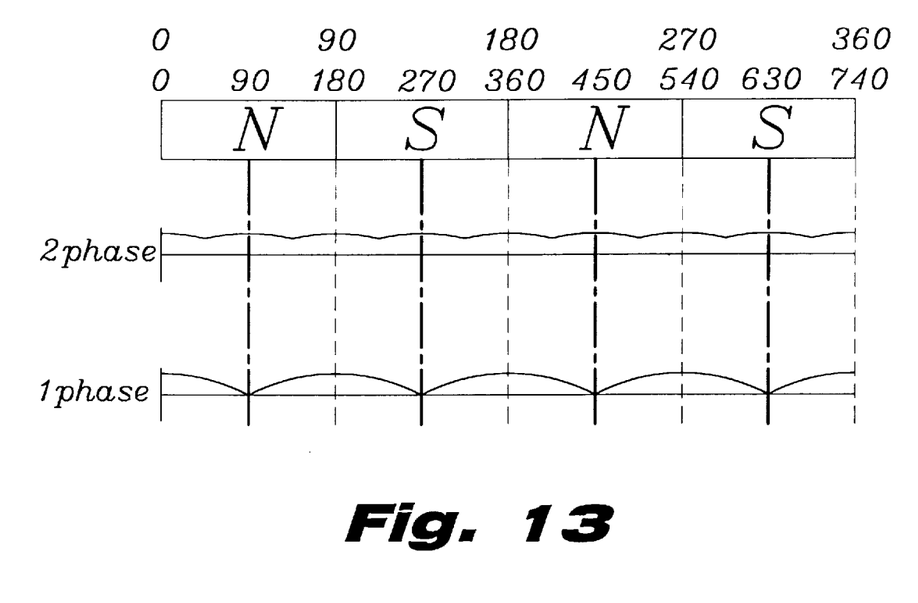
FIG. 13 is a composite torque waveform diagram according to the present invention.

As described above, as current flows to the coils which have different phases, a composite torque is generated in the motor as shown in FIG. 13. In this connection, it is to be readily understood that a more stabilized driving torque is generated by the composite torque when compared to a composite torque which is outputted from a single-phase motor.

In other words, while a dead point where driving force becomes zero is generated in the single-phase motor at the time when current flow is converted, in the present invention, the dead point is not generated and stable drivability is ensured.

Also, in the present invention, by altering a connection structure between the plurality of segments of the commutator and the pair of brushes, it is possible to prevent a non-electrification section where current supply is cut off when current flow is converted, from being generated, whereby the stable electrification can be continuously maintained.

Specifically, in the two-phase driving motor which is obtained by modifying a conventional three-phase driving motor, a coil pitch of a mechanical angle of 60° must be maintained, and portions of two coils which have different phases are overlapped with each other to be stacked over and under, whereby a problem is caused in that a thickness of the coil is decreased by spatial limitations of the motor. On the contrary, in the present invention, due to the fact that coils have a pitch of a mechanical angle of 90° or 45°, and two coils or four coils are located on the same plane in side by side relationships, a thickness of one coil is increased and the number of windings of the respective coils which have the same phase is also increased, whereby interlinkage magnetic flux flowing through coils is augmented.

In other words, in a two-phase driving motor which is obtained by modifying a three-phase driving motor, the respective coils have a pitch of a mechanical angle of 60°, and due to the fact that two coils having the same phase are provided, an overall pitch of 120° is obtained. On the contrary, in the present invention, in the case of the first embodiment, the coils have a pitch of a mechanical angle of 90° and a thickness which is the same as that in the conventional art. Therefore, while, in the conventional art, two coils are stacked over and under, because in the first embodiment of the present invention, only one coil is provided at one side and as a result, two coils each having a pitch of a mechanical angle of 90° are provided, an overall pitch of 180° is obtained. Also, in the case of the second embodiment, while the coil have a pitch of a mechanical angle of 45°, when viewed in the same manner as in the first embodiment, a thickness thereof is the same as that of two coils each having a pitch of a mechanical angle of 45°. Also, as described above, since two coils having the same phase are provided, the same effect as in the case that four coils each having a pitch of a mechanical angle of 45° are provided, is achieved, whereby an overall pitch of 180° is obtained.

Accordingly, while a winding range is limited to 120° in the conventional art, since it is expanded to 180° in the present invention, as a result, it is to be readily understood that the number of windings of the coils having the same phase is increased and interlinkage magnetic flux flowing through coils is also increased, whereby a driving torque of a motor is elevated.

Also, while, in the conventional structure obtained by modifying a three-phase driving motor, coils of one-phase are removed thereby exhibiting unstable and unstabilized driving characteristics, in the two-phase driving motor of the present invention, more stable two-phase stabilized driving characteristics are obtained.

As described above, according to the present invention, advantages are provided in that, since the number of magnetic poles of a stator magnet, a pitch of respective coils of an armature coil interacting with the stator magnet and a phase difference between the coils are established to predetermined values, a two-phase half-wave driving characteristic is accomplished, and since a plurality of segments of a commutator has the number which is two times the number of the magnetic poles, interlinkage magnetic flux is increased in coils having different phases, thereby elevating a driving torque. Further, since the commutator and a pair of brushes which cooperatively function to supply electric power from the outside to the respective coils, are modified in a simple manner, a non-electrification section is not generated, whereby a stable power supply to the coils and accordingly, a stable and continuous driving of the motor are ensured.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A flat two-phase vibration motor comprising:
   a lower board attached to an upper surface of a lower case;
   a stator magnet disposed on the lower board and having four magnetic poles;
   a shaft supported between the lower case and an upper case;
   an upper board rotatably coupled to the shaft to be eccentrically supported thereby;
   two armature coils of different phases attached to the upper board such that each of the two armature coils has a pitch of a mechanical angle of 90° and the two armature coils have a center angle therebetween of a mechanical angle of 135° and a phase difference therebetween of an electrical angle of $\pi/2$;
   a commutator attached to the upper board around the shaft and having eight segments; and
   a pair of brushes having lower ends which are attached to the lower board and upper ends which are arranged such that they can be brought into contact with the segments of the commutator while being separated from each other by an electrical angle of 90°.

2. A flat two-phase vibration motor as claimed in claim 1, wherein a curved contact end of each brush is formed such that it is inclined with respect to a slot defined between two adjoining segments of the commutator in a direction which is crossed with a lengthwise direction of the brush, whereby the curved contact end of the brush can be brought into contact with one segment of the two adjoining segments or with both of the two adjoining segments.

3. A flat two-phase vibration motor as claimed in claim 1, wherein one end of each brush has a yoke-shaped configuration which defines a pair of end portions, and a pair of curved contact ends are formed at the pair of end portions of the brush, respectively, such that they are separated by a predetermined distance from each other in a lengthwise direction of the brush while they are maintained at the same distance from a slot defined between two adjoining segments of the commutator, whereby the pair of curved contact ends of the brush can be brought into contact with one segment of the two adjoining segments or with both of the two adjoining segments.

4. A flat two-phase vibration motor as claimed in claim 1, wherein a slot is defined between two adjoining segments of the commutator such that it extends in a radial direction; the slot includes an outer slot portion which is defined outside the segments and an inner slot portion which is defined inside the segments; and the outer slot portion and the inner slot portion are defined such that they are aligned on two straight lines, respectively, while they are communicated with each other by a middle slot portion which extends in a lengthwise direction of a brush, whereby a curved contact end of the brush can be brought into contact with one segment of the two adjoining segments or with both of the two adjoining segments.

5. A flat two-phase vibration motor as claimed in claim 1, wherein a slot is defined between two adjoining segments of the commutator such that it extends slantingly in a radial direction, whereby a curved contact end of each brush can be brought into contact with one segment of the two adjoining segments or with both of the two adjoining segments.

6. A flat two-phase vibration motor comprising:
   a lower board attached to an upper surface of a lower case;
   a stator magnet disposed on the lower board and having four magnetic poles;
   a shaft supported between the lower case and an upper case;
   an upper board rotatably coupled to the shaft to be eccentrically supported thereby;
   four armature coils attached to the upper board such that each of the four armature coils has a pitch of a mechanical angle of 45°, adjoining two armature coils are separated from each other by a mechanical angle of 45° and have a phase difference therebetween of an electrical angle of $\pi/2$, each pair of armature coils having the same phase are connected with each other in series, one of two input-side armature coils and one of two output-side armature coils are alternately arranged, with the input-side coil and the output-side coil having different phases;
   a commutator attached to the upper board around the shaft and having eight segments; and
   a pair of brushes having lower ends which are attached to the lower board and upper ends which are arranged such that they can be brought into contact with the segments of the commutator while being separated from each other by an electrical angle of 90°.

7. A flat two-phase vibration motor as claimed in claim 6, wherein a curved contact end of each brush is formed such that it is inclined with respect to a slot defined between two adjoining segments of the commutator in a direction which is crossed with a lengthwise direction of the brush, whereby the curved contact end of the brush can be brought into contact with one segment of the two adjoining segments or with both of the two adjoining segments.

8. A flat two-phase vibration motor as claimed in claim 6, wherein one end of each brush has a yoke-shaped configuration which defines a pair of end portions, and a pair of curved contact ends are formed at the pair of end portions of the brush, respectively, such that they are separated by a predetermined distance from each other in a lengthwise direction of the brush while they are maintained at the same distance from a slot defined between two adjoining segments of the commutator, whereby the pair of curved contact ends of the brush can be brought into contact with one segment of the two adjoining segments or with both of the two adjoining segments.

9. A flat two-phase vibration motor as claimed in claim 6, wherein a slot is defined between two adjoining segments of the commutator such that it extends in a radial direction; the slot includes an outer slot portion which is defined outside the segments and an inner slot portion which is defined inside the segments; and the outer slot portion and the inner slot portion are defined such that they are aligned on two straight lines, respectively, while they are communicated with each other by a middle slot portion which extends in a lengthwise direction of a brush, whereby a curved contact end of the brush can be brought into contact with one segment of the two adjoining segments or with both of the two adjoining segments.

10. A flat two-phase vibration motor as claimed in claim 6, wherein a slot is defined between two adjoining segments of the commutator such that it extends slantingly in a radial direction, whereby a curved contact end of each brush can be brought into contact with one segment of the two adjoining segments or with both of the two adjoining segments.

* * * * *